US009206369B2

(12) United States Patent
Richardson et al.

(10) Patent No.: US 9,206,369 B2
(45) Date of Patent: Dec. 8, 2015

(54) METHODS OF IMPROVING COMBUSTION OF SOLID FUELS

(76) Inventors: Melvin A. Richardson, Roanoke, VA (US); James E. Lester, Hardy, VA (US); Joseph W. Hundley, Martinsville, VA (US)

( * ) Notice: Subject to any disclaimer, the term of this patent is extended or adjusted under 35 U.S.C. 154(b) by 0 days.

(21) Appl. No.: 13/355,674

(22) Filed: Jan. 23, 2012
(Under 37 CFR 1.47)

(65) Prior Publication Data
US 2012/0311924 A1 Dec. 13, 2012

Related U.S. Application Data

(63) Continuation of application No. 13/157,787, filed on Jun. 10, 2011, now abandoned, which is a continuation of application No. 12/694,024, filed on Jan. 26, 2010, now Pat. No. 8,690,971, which is a continuation-in-part of application No. 10/790,545, filed on Mar. 1, 2004, now Pat. No. 7,651,541, which is a continuation-in-part of application No. 10/086,902, filed on Mar. 1, 2002, now Pat. No. 6,860,911, which is a continuation-in-part of application No. 09/757,765, filed on Jan. 10, 2001, now Pat. No. 6,740,133.

(60) Provisional application No. 60/490,995, filed on Jul. 29, 2003, provisional application No. 60/451,590, filed on Mar. 3, 2003.

(51) Int. Cl.
| | |
|---|---|
| *C10L 5/00* | (2006.01) |
| *C10L 5/32* | (2006.01) |
| *C10L 10/00* | (2006.01) |
| *C10L 9/10* | (2006.01) |
| *C10L 1/32* | (2006.01) |
| *C10L 10/02* | (2006.01) |
| *B01F 17/00* | (2006.01) |

(52) U.S. Cl.
CPC ............. *C10L 10/00* (2013.01); *B01F 17/0028* (2013.01); *B01F 17/0042* (2013.01); *C10L 1/328* (2013.01); *C10L 5/32* (2013.01); *C10L 9/10* (2013.01); *C10L 10/02* (2013.01)
USPC .................... 44/620; 44/603; 44/627; 44/544

(58) Field of Classification Search
CPC ........... C10L 10/00; C10L 10/02; C10L 9/10; C10L 5/32; C10L 1/328; B01F 17/0042; B01F 17/0028; Y02E 50/30
USPC ........... 44/542, 544, 545, 562, 604, 620–624, 44/627, 603, 593
See application file for complete search history.

(56) References Cited

U.S. PATENT DOCUMENTS

| | | | |
|---|---|---|---|
| 3,281,318 A | 10/1966 | Stutz | |
| 3,332,755 A | 7/1967 | Kukin | |
| 3,346,487 A | 10/1967 | Riyad | |
| 3,689,234 A * | 9/1972 | Onazawa | ........................ 44/554 |
| 3,898,076 A | 8/1975 | Ranke | |
| 3,935,021 A | 1/1976 | Greve | |
| 4,097,437 A | 6/1978 | Dhake | |
| 4,183,757 A | 1/1980 | Groszek | |
| 4,741,278 A | 5/1988 | Franke | |
| 4,824,441 A | 4/1989 | Kindig | |
| 4,968,324 A | 11/1990 | Franke | |
| 5,298,040 A * | 3/1994 | Gosset et al. | ................... 44/560 |
| 5,330,795 A | 7/1994 | Batdorf | |
| 5,437,722 A | 8/1995 | Borenstein | |
| 5,578,239 A * | 11/1996 | Bennett | ....................... 252/88.1 |
| 5,631,042 A | 5/1997 | Becker | |
| 5,968,237 A | 10/1999 | Sinnige | |
| 6,013,116 A * | 1/2000 | Major et al. | .................... 44/551 |
| 6,187,386 B1 | 2/2001 | Hundley | |
| 6,206,685 B1 | 3/2001 | Zamansky | |
| 6,214,064 B1 * | 4/2001 | Boss et al. | ....................... 44/593 |
| 6,471,506 B1 | 10/2002 | Zamansky | |
| 6,740,133 B2 * | 5/2004 | Hundley, Jr. | .................... 44/301 |
| 6,860,911 B2 * | 3/2005 | Hundley | ........................ 44/620 |
| 7,357,903 B2 | 4/2008 | Zhou | |
| 7,651,541 B2 | 1/2010 | Hundley | |
| 7,862,630 B2 | 1/2011 | Hundley | |
| 8,690,971 B2 | 4/2014 | Hundley | |
| 2005/0202989 A1 | 9/2005 | Wilson | |

OTHER PUBLICATIONS

Letters and supporting exhibits received from Joseph Hundley on Dec. 18, 2014.

* cited by examiner

*Primary Examiner* — Pamela H Weiss
(74) *Attorney, Agent, or Firm* — Rhodes IP PLC; Christopher R Rhodes

(57) ABSTRACT

A method comprising applying a chemical change reagent to coal prior to combustion of the coal is provided. In some instances, the chemical change reagent can include an effective amount of a material to reduce NOx emissions, SOx emissions, or both from combustion of the coal.

13 Claims, No Drawings

METHODS OF IMPROVING COMBUSTION OF SOLID FUELS

CROSS REFERENCE TO RELATED APPLICATIONS

The present application is a continuation of U.S. application Ser. No. 13/157,787 filed on Jun. 10, 2011, which was a continuation of U.S. application Ser. No. 12/694,024 filed on Jan. 26, 2010. U.S. application Ser. No. 12/694,024is a continuation-in-part of U.S. application Ser. No. 10/490,545, filed Mar. 1, 2004, which is a Continuation-In-Part of Ser. No. 10/086,902 filed Mar. 1, 2002, which is a continuation in part of Ser. No. 09/757,765, filed Jan. 10, 2001, all of said applications incorporated herein by reference. This application also incorporated by reference and claims the benefit of U.S. provisional applications, Ser. No. 60/451,590, filed Mar. 3, 2003, and Ser. No. 60/490,995, filed Jul. 29, 2003, all of said applications incorporated herein by reference.

FIELD OF THE INVENTION

The present invention relates in general to methods for efficiently delivering catalyst additives to the surface of solid fuels to facilitate improved combustion and effective and efficient removal of noxious emissions such as NOx from solid fuel materials such as coal.

BACKGROUND OF THE INVENTION

At present, there is a constant need for additional methods to utilize solid fuels such as coal, but minimize emissions of noxious gases that may arise from the fuel's combustion. This invention is directed to overcoming past problems in obtaining clean and safe fuels and providing methods for reducing or eliminating the emission of noxious gases such as NOx when combusting fuels such as coal, wood or biomass.

This invention centers around methods for effectively and efficiently delivering catalyst materials to the surface of a solid fuel maintaining the catalyst in relation to the solid fuel such that the catalyst is available at the earliest stages of combustion of the solid fuel. The catalysts are most effective at reducing noxious emissions such as NOx when available in the earliest stages of the combustion process. It is also important to ensure maximum contact between the catalyst and the combustion gases. In general, these catalysts which can be referred to as chemical change agents may contain functional groups which are chemically active and which can combine with coal to bring about a compositional changes and result in the reduction and/or elimination of noxious gases such as NOx.

SUMMARY OF THE INVENTION

In accordance with the invention, compositions and methods are provided for reducing NOx emissions from the combustion of coal or other solid fuels, said method comprising providing a suspension or dispersing agent consisting essentially of by weight of

| | |
|---|---|
| a Hydrocarbon wax | 0-60% |
| a Fatty acid | 0-10% |
| Ammonia | 0-2% |
| Ammonia like compounds selected from the group consisting of Amides, Amines, Amino acid and other chemical compounds which contain at least one NH, NH$_2$, or NH$_3$ functional group. | 0-60% |
| Water | 30-90% | providing a micronized catalyst agent comprising of Titanium Dioxide in the range of 1-30% and a co-catalyst comprising a micronized catalyst made of a material selected from the group consisting of Aluminum Silicate and other Zeolites, Vanadium Oxide, Tungsten Oxide, Iron Oxide, other Iron Compounds and combinations of the foregoing; said catalysts having a high surface area to mass ratio for optimized performance to catalyze the reactions that reduce NOx emissions from the combustion of coal or other solid fuels; providing coal or other solid fuels; introducing the suspension or dispersing agent, the micronized catalyst, or a combination of the two to said coal or other solid fuels such as wood or biomass in such a manner so as to evenly place the agent or catalyst on the surface of the fuel and maximize the contact between the agent and/or catalyst and combustion gases; and combusting the fuel in the presence of the agent and/or catalyst so as to effect a reduction of noxious emissions from the combustion process of the fuel thereby.

This process can be carried out without any boiler modification or combustion zone modifications, and dispensing and/or suspending agents or fillers may also be added. The suspending and/or dispersing agent are preferable organic oxygen compounds and may be selected from the group consisting of sugar, acetic acid and salts thereof, glycerol, and oils that can be added to the catalyst to promote suspension. Such oils are preferably those used in the manufacture of paint. With regard to the catalyst, it is also preferred that the catalyst will have a high surface area to mass ratio and will have a particle size similar to paint grade pigments such as Dupont's Ti-Pure R-900™. During the processes of the invention, it is possible to include a step of grinding the solid fuel to dust so as to further promote even distribution of the catalyst thereon. Other methods of achieving NOx reduction or elimination in accordance with the invention as set forth below.

A method is also provided for reducing NOx by producing Ammonia during the combustion of coal, wood, or biomass which method promotes the following reaction:

$$N_2 + 3H_2O \rightarrow 2NH_3 + 1.5O_2;$$

wherein ammonia reduces NOx to Nitrogen gas. In this method, a source of combustible fuel is provided along with a micronized catalyst having the highest surface area to mass ratio commercially feasible. The catalyst may also be comprised of titanium dioxide and a co-catalyst including materials selected from the group consisting of aluminum oxide, aluminum silicate and other zeolites, vanadium oxide, tungsten oxide, potassium oxide, sodium oxide, iron oxide, other iron containing compounds and combination of the foregoing. In this method, once again the catalyst is applied evenly to coal, wood or biomass when combusted to promote reduction of NOx emissions. Similarly, the present invention contemplates the production of ammonia to effect the reduction of NOx during the combustion of coal, wood, or biomass suing the same reaction described above.

A method of applying a NOx reduction agent to a combustible solid fuel prior to introduction of the fuel to the combustion process is also provided which comprises providing a source of combustible solid fuel selected from the group consisting of coal, wood, and biomass, and providing a suspension and dispersing agent consisting essentially of by weight,

| | |
|---|---|
| A Hydrocarbon wax | 0-60% |
| An Emulsifying agent or a protective colloid | 1-20% |

-continued

| | |
|---|---|
| Ammonia | 0-2% |
| Ammonia like compounds selected from the group consisting of Amides, Amines, Amino acid and other chemical compounds which contain at least one NH, $NH_2$, or $NH_3$ functional group. | 0-60% |
| Water | 30-90%; |

This method also includes providing a catalyst as discussed above, and this catalyst can comprise a plurality of catalysts selected from the group consisting of Aluminum Silicate or other Zeolites, Vanadium Oxide, Tungsten Oxide, Titanium Dioxide, Iron Oxide, other Iron Compounds and combinations of the foregoing. These catalysts preferably have a high surface area to mass ratio for optimized performance to catalyze the reactions that reduce NOx emissions from the combustion process and may have particle sizes similar to paint grade pigments. Suitable particle sizes are wherein the mean particle size is less than 1000 nm, and may also be less than 500 nm. In cases where an iron oxide catalyst is used and the amount is greater than 50% of the catalyst composition, then sodium oxide potassium oxide, potassium chloride or sodium chloride may be used as co-catalysts.

The present invention further contemplates a method of reducing Carbon Dioxide per unit of energy captured while controlling the emissions of NOx from a combustion process which comprises providing a combustible solid fuel, providing a micronized catalyst material, Introducing the micronized catalyst material to the combustible solid fuel in a manner to evenly distribute the micronized catalyst on the surface of the combustible solid fuel; introducing the micronized catalyst and combustible solid fuel to a combustion process where there is no modification of the combustion equipment; allowing increasing air and or oxygen flow into the combustion process so as to allow increasing flame or combustion zone temperatures to increase energy output per unit combustible solid fuel resulting in increased energy capture per unit combustible solid fuel introduced, and allowing the micronized catalyst to effect the control of NOx emissions during the combustion process. The micronized catalyst material may be selected from the group consisting of Aluminum Silicate or other Zeolites, Vanadium Oxide, Tungsten Oxide, Titanium Dioxide, Iron Oxide, other Iron Compounds and combinations of the foregoing. As indicated above, the present methods may be carried out without boiler modification or combustion zone modifications.

It is thus an object of this invention to provide a method of delivering catalysts to the surface of a solid fuel prior to or during combustion and to provide an emission reduction agent for the reduction of NOx and other noxious emissions from the combustion of solid fuels.

It is another object of this invention to provide an agent for reduction of NOx and other noxious emissions which is environmentally acceptable and inexpensive.

It is still another object of this invention to provide a product which can be used as an emission reduction agent for the reduction of NOx and other noxious emissions from the combustion of solid fuels, a combustion enhancer, or both.

It is yet another object of this invention to provide a product which can be applied to a combustible via a spray application process prior to the introduction of the combustible into a boiler so that known emission reducing catalyst compounds can be introduced into the combustion process without requiring boiler modifications.

It is a further object of this invention to provide a product which is introduced to a fuel such as coal prior to combustion and preferably by grinding it up with the coal before the coal enters the combustion chamber so as to be dispersed evenly throughout the coal to facilitate complete combustion and a reduction in NOx and other noxious emissions.

It is a further object of this invention to control NOx emissions while enabling higher efficiency use of a fuel in the combustion chamber, thus reducing the fuel consumption rate and emission of other noxious compounds and other effluents of concern such as carbon dioxide.

These and other objects of this invention will become more apparent when reference is had to the accompanying specification.

DETAILED DESCRIPTION OF THE PREFERRED EMBODIMENTS

The invention generally encompasses the application of certain chemicals and compounds which can be used as bona fide chemical change reagents. These create a significant amount of chemical change when applied to the exterior of the coal to become a synfuel product. Furthermore, the enhancement of the basic chemical change reagent with ammonia like compounds, the chemical change agent will reduce NOx emissions in the exhausts gases created upon burning of said coal. The various formulations, including but not limited to those claimed below, can be utilized specifically for the purpose of being a sprayed on NOx reducing agent before the burner or combustion and ideally before the grinding of the coal. Grinding distributes the NOx reducers evenly. The use of a wetting agent promotes the absorption of the chemical change agent and NOx reducers into the coal thus improving chemical change and even distribution of NOx reducers. Titanium Dioxide can be added to the composition to promote NOx reduction since Titanium Dioxide acts as a catalyst for NOx reduction.

As discussed herein, Ammonia like compounds can refer to amides, amines, amino acids and other chemical compounds containing at least one functional NH, NH2 or NH3 group. Ammonia like compounds act as NOx reducers when burned with coal. Hydrocarbon wax is used in some versions to keep the NOx reducing agents from leaching out. This is important since coal may be rained on during the transportation or in stockpiles. Hydrocarbon Wax may be selected from the group consisting of paraffin wax, slack wax, microcrystalline wax, olefinic wax, fatty acid and mixtures thereof. The product can be used as a chemical change agent, NOx reducing agent or both a chemical change agent and a NOx reducing agent.

In general, in accordance with the invention, a catalyst with the highest surface area to mass ratio is applied to solid fuels in a manner to evenly distribute catalyst on the surface of the fuel so that catalyst is effective in the early stages of the combustion process. The catalyst is most effective when maximum contact is made between the catalyst and combustion gases and when the catalyst is of the smallest particle size which improves contact between catalyst and early stage combustion gases and reduces the amount of catalyst needed to promote removal of noxious gas emissions. For NOx reduction, multiple mechanisms for control and reduction are supported. NOx may be controlled and reduced by direct catalysis during combustion and catalysts also promote formation of ammonia during combustion which contribute to NOx reduction post combustion. It was also observed the peak temperatures of combustion can be allowed to rise by increasing the air to fuel ratio while still maintaining low NOx emissions. This is important because higher flame temperatures allow higher energy transfer with less CO2. Another benefit of increasing air while controlling NOx is to reduce unburned fuel.

The invention generally encompasses the application of certain chemicals and compounds which can be used efficiently and effectively as NOx reduction agents or for the reduction of other noxious emissions produced from the combustion of solid fuels. The first group of chemicals and compounds are utilized to suspend and disperse one or more NOx reduction catalysts. This group of compounds may be constructed to produce a dispersed product, a suspended product, or produce a protective colloid or emulsion. Depending on the requirements of the application; one of these types of dispersing or suspending agents will be employed with one or more catalyst compounds to provide the most effective and efficient means for delivering a catalyst solution to a particular solid fuel combustion situation to maximize the reduction of NOx or other noxious emissions from the combustion reaction. The smallest particles of catalyst are used because they are the easiest to disperse in liquids and stay dispersed longer. Catalyst particle having the highest surface area to mass ratio would require less catalyst since catalyst reactions take place on the surface of the catalyst. For our test we have used pigment grade catalyst having a mean particle size less than 500 nm. Particle size above 1000 nm are normally considered as too large to stay suspended. The particles with the highest surface area to cost ratio are also favored.

Suspending or dispersion methods include but are not limited to the following methods:

Method A.

Suspend catalyst in a manner similar to dispersing paint pigments. Method comprises essentially of mixing catalyst with oil or hydrocarbon wax, mixing or grinding until oil or hydrocarbon wax has been absorbed by catalyst, adding emulsifying agent or dispersing agent with water then mixing. Viscosity modifiers may be added to change viscosity. Higher viscosity helps suspend catalyst stay suspended longer without remixing.

Method B.

Add catalyst to suspending or dispersing agent while mixing; add viscosity modifiers as needed. Higher density and viscosity as well as using the smallest particles of catalyst improve suspension of catalyst.

Method C.

Point of use method is lowest cost and is comprised of mixing catalyst on site with water or with dispersing agent, maintaining mixing as slurry or dispersion is sprayed on solid fuel.

In all three methods the smallest particles of catalyst or particles with the highest surface area to mass ratio stay suspended better and allows for less catalyst to be used. The higher the density and or viscosity of liquid the longer catalyst stays suspended. Method A is most effective when catalyst absorbs oil or hydrocarbon wax, the higher the absorption value of the catalyst for oil is the better method A keeps catalyst in suspended.

A dispersion of catalyst compounds may be accomplished utilizing a hydrophilic or hydrophobic dispersion media. These may be stable or unstable dispersions depending on the needs of the application. Protective colloids and emulsions may be employed to aid in the stability of the overall product. Any of these methods can aid in the even distribution of the catalyst on the surface of the solid fuel.

Known NOx reducing catalysts are Titanium Dioxide, Zeolites, Tungsten Oxide, Vanadium Oxide, Aluminum Silicate, Iron Oxide as well as reacted metals, Iron Compounds and Iron containing compounds, oxides of potassium and sodium and any combination of the above. These catalysts are involved in the direct reduction of NOx or indirectly with the formation of ammonia. This treatment, which is unique and novel, can be used in conjunction with "combustion flu gas treatment technology".

The following is a non-limiting example of use in accordance with the invention:

Small Boiler Test

Testing was conducted on a small 2 MMBTU coal fired boiler where the focus of the testing was to further quantify the NOx reduction achievable with NOx reduction agents containing combinations of titanium dioxide and iron oxide catalysts added to the surface of a pulverized bituminous coal. A test matrix of catalyst concentrations was developed where the concentrations by weight for titanium dioxide ranged from 0 to 0.5% and iron oxide was varied from 0-2% by weight. Each condition in the test matrix was represented by equal weight batches of coal treated with a single catalyst and/or combination of catalyst materials. The batches were introduced into the boiler feed hopper in a controlled fashion such that as each test batch was introduced its specific boiler and emissions impact could be separated and quantified. It was observed that all batches showed various levels of NOx reduction. Specifically, batches where combinations of titanium dioxide and iron oxide were present showed the greatest reduction in NOx emissions. It was also observed from the testing that average boiler temperatures were higher for the series of tests where NOx reduction agents containing combinations of titanium dioxide and iron oxide were tested. Higher NOx reduction was effected in spite of the higher temperatures that would typically lead to higher NOx emissions. After the completion of testing, inspection of the internal surfaces of the boiler showed no unusual build-up of deposits on the boiler surfaces.

As indicated above, the present invention relates to a composition to be used as an emission reduction agent for combustible materials, especially coal. One of the compositions contemplated by this invention includes a hydrocarbon emulsion or slurry with titanium dioxide and a separate co-catalyst. The percentage of ingredients on a weight basis is as follows:

| | |
|---|---|
| a Hydrocarbon wax | 0-60% |
| a Fatty acid | 0-10% |
| Ammonia | 0-2% |
| Ammonia like compounds selected from the group consisting of Amides, Amines, Amino acid and other chemical compounds which contain at least one NH, $NH_2$, or $NH_3$ functional group. | 0-60% |
| Water | 30-90% or 30-99% |
| Titanium Dioxide | 1-30% |

Additional catalysts can be added to the hydrocarbon slurry or to the solid fuel directly in combination with the hydrocarbon slurry. These additional catalysts include Aluminum silicate and other Zeolites, Tungsten Oxide, Vanadium Oxide, Iron Oxide as well as reacted metals, Iron Compounds and Iron containing compounds and any combination of the above. The titanium dioxide and additional catalysts should be of small particle size to obtain the greatest "surface area to mass" ratio. The slurry and catalysts are added directly to the solid fuel such as coal, wood, or biomass before or during combustion. This method enables good dispersion of the titanium dioxide and additional catalysts on the surface of the coal. Maintaining the titanium dioxide and additional catalysts on the surface of the coal ensures maximum contact with combustion gases for effective and efficient reduction of NOx and other noxious emissions.

Although hydrocarbon wax, fatty acid and water are shown as a dispersing or suspending agent; other dispersing or suspending agent would provide similar capability.

Another of the compositions contemplated by this invention includes other dispersing or suspending agents with titanium dioxide and a separate co-catalyst. The percentage of ingredients on a weight basis is as follows:

| | |
|---|---|
| Dispersing or suspending agent | 1-70% |
| Water | 29-98% |
| Titanium dioxide | 1-60% |

Additional catalysts can be added to the dispersing or suspending agent or to the solid fuel directly in combination with the dispersing or suspending agent. These additional catalysts include Aluminum silicate and other Zeolites, Tungsten Oxide, Vanadium Oxide, Iron Oxide as well as reacted metals, Iron Compounds and Iron containing compounds and any combination of the above. The titanium dioxide and additional catalysts should be of small particle size to obtain the greatest "surface area to mass" ratio. The dispersing or suspending agent and catalysts are added directly to the solid fuel such as coal, wood, or biomass before or during combustion. This method enables good dispersion of the titanium dioxide and additional catalysts on the surface of the coal. Maintaining the titanium dioxide and additional catalysts on the surface of the coal ensures maximum contact with combustion gases for effective and efficient reduction of NOx and other noxious emissions.

Another of the compositions contemplated by this invention includes a dispersing or suspending agent with one or more catalysts. The percentage of ingredients on a weight basis is as follows:

| | |
|---|---|
| Hydrocarbon wax | 0-60% |
| An Emulsifying agent or a protective colloid | 1-20% |
| Ammonia | 0-2% |
| Ammonia like compounds selected from the group consisting of Amides, Amines, Amino acid and other chemical compounds which contain at least one NH, $NH_2$, or $NH_3$ functional group. | 0-60% |
| Water | 30-99% |

Catalysts can be added to the dispersing or suspending agent or to the solid fuel directly in combination with the dispersing or suspending agent. These catalysts include Aluminum silicate and other Zeolites, Tungsten Oxide, Vanadium Oxide, Titanium dioxide, Iron Oxide as well as reacted metals, Iron Compounds and Iron containing compounds and any combination of the above. The catalysts should be of small particle size to obtain the greatest "surface area to mass" ratio. The slurry and catalysts are added directly to the solid fuel such as coal, wood, or biomass before or during combustion. This method enables good dispersion of the catalysts on the surface of the coal. Maintaining the catalysts on the surface of the coal ensures maximum contact with combustion gases for effective and efficient reduction of NOx and other noxious emissions.

As catalysts and dispersing or suspending agent are added to a solid fuel such as coal separately or in combination; a grinding step may be added as these materials are added.

Another of the compositions contemplated by this invention includes a hydrocarbon emulsion or slurry with titanium dioxide and a separate co-catalyst. The percentage of ingredients on a weight basis is as follows:

| | |
|---|---|
| Hydrocarbon wax | 0-60% |
| A dispersing or suspending agent | 1-70% |
| Ammonia | 0-2% |
| Ammonia like compounds selected from the group consisting of Amides, Amines, Amino acid and other chemical compounds which contain at least one NH, $NH_2$, or $NH_3$ functional group. | 0-60% |
| Water | 30-99% |
| Titanium dioxide | 0-10% |

Additional catalysts can be added to the hydrocarbon slurry or to the solid fuel directly in combination with the hydrocarbon slurry. These additional catalysts include Aluminum silicate and other Zeolites, Tungsten Oxide, Vanadium Oxide, Iron Oxide as well as reacted metals, Iron Compounds and Iron containing compounds and any combination of the above. The titanium dioxide and additional catalysts should be of small particle size to obtain the greatest "surface area to mass" ratio. The slurry and catalysts are added directly to the solid fuel such as coal, wood, or biomass before or during combustion. This method enables good dispersion of the titanium dioxide and additional catalysts on the surface of the coal. Maintaining the titanium dioxide and additional catalysts on the surface of the coal ensures maximum contact with combustion gases for effective and efficient reduction of NOx and other noxious emissions.

Another of the compositions contemplated by this invention includes other dispersing and suspending agents with one or more catalysts. The percentage of ingredients on a weight basis is as follows:

| | |
|---|---|
| Dispersing and suspending agent or filler comprised of oxygen containing organic compounds | As needed |
| Water | 30-90% |

Catalysts can be added to the dispersing and suspending agent or to the solid fuel directly in combination with the dispersing and suspending agent. These catalysts include Aluminum silicate and other Zeolites, Tungsten Oxide, Vanadium Oxide, Titanium dioxide, Iron Oxide as well as reacted metals, Iron Compounds and Iron containing compounds and any combination of the above. The catalysts should be of small particle size to obtain the greatest "surface area to mass" ratio. The slurry and catalysts are added directly to the solid fuel such as coal, wood, or biomass before or during combustion. This method enables good dispersion of the catalysts on the surface of the coal. Maintaining the catalysts on the surface of the coal ensures maximum contact with combustion gases for effective and efficient reduction of NOx and other noxious emissions.

As catalysts and dispersing or suspending agent are added to a solid fuel separately or in combination; a grinding step may be added as these materials are added. The solid fuel may be coal. The suspending and dispersing agent and or filler material is made of any oxygen containing compounds like sugar, acetic acid, and salts of acetic acid, as well as glycerol, in addition oils may be added to some catalyst to help with suspending, as in manufacturing of paint.

Another of the compositions contemplated by this invention includes other dispersing and suspending agents with one or more catalysts. The percentage of ingredients on a weight basis is as follows:

| Dispersing and suspending agent or filler | As needed |
|---|---|
| Water | 30-90% |
| Titanium Dioxide | 0-10% |

Additional catalysts can be added to the dispersing and suspending agent or filler or to the solid fuel directly in combination with the dispersing and suspending agent or filler. These additional catalysts include Aluminum silicate and other Zeolites, Tungsten Oxide, Vanadium Oxide, Iron Oxide as well as reacted metals, Iron Compounds and Iron containing compounds and any combination of the above. The titanium dioxide and additional catalysts should be of small particle size to obtain the greatest "surface area to mass" ratio. The dispersing and suspending agent or filler and catalysts are added directly to the solid fuel such as coal, wood, or biomass before or during combustion. This method enables good dispersion of the titanium dioxide and additional catalysts on the surface of the coal. Maintaining the titanium dioxide and additional catalysts on the surface of the coal ensures maximum contact with combustion gases for effective and efficient reduction of NOx and other noxious emissions.

As catalysts and dispersing or suspending agent are added to a solid fuel separately or in combination; a grinding step may be added as these materials are added. The solid fuel may be coal. The suspending and dispersing agent and or filler material is made of any oxygen containing compounds like sugar, acetic acid, and salts of acetic acid, as well as glycerol, in addition oils may be added to some catalyst to help with suspending, as in manufacturing of paint. Coal antifreeze as well as dust suppressants may be used to disperse catalyst thus several benefits from one product. Another of the methods contemplated by this invention includes a method of reducing NOx emissions in the burning of coal, said method comprising of providing a combustible fuel like coal, adding catalytic compound to a NOx reducing chemical change agent or to the coal directly, before or during combustion, said catalyst having the highest surface area to mass ratio that is commercially practical, said catalyst having an average particle size of similar to paint grade pigments, adding said NOx reducing chemical change agent to said coal in a manner to keep catalyst on surface of coal so contact is maximized between catalyst, air, and combustion gases.

Another of the methods contemplated by this invention includes a method of reducing NOx emissions in the burning of a solid fuel, said method comprising of providing a combustible fuel like coal, adding catalytic compound to a NOx reducing chemical change agent or to the fuel directly, before or during combustion, said catalyst having the highest surface area to mass ratio that is commercially practical, said catalyst having an average particle size of similar to paint grade pigments, adding said NOx reducing chemical change agent to said coal in a manner to keep catalyst on surface of coal so contact is maximized between catalyst, air, and combustion gases. And further comprising the following catalyst selected from the group consisting of Aluminum Silicate and other Zeolites, Vanadium Oxide, Tungsten Oxide, Titanium Dioxide, Iron oxide, other Iron compounds, and a combination of the foregoing. These catalyst should have mean particle size similar to paint grade pigments, like Dupont's Ti-Pure R-900. Mean particle size must be smaller than 1000 nm. Catalyst particles above 1000 nm would be difficult to disperse as well as having surface area to mass ratio to low to be cost effective.

Another of the compositions contemplated by this invention includes other dispersing and suspending agents with iron oxide as a catalyst. The percentage of ingredients on a weight basis is as follows:

| Hydrocarbon or oxygen containing hydrocarbon with a density or viscosity sufficient to suspend catalyst | 1-70% |
|---|---|
| Water | 0-48% |
| Iron oxide | 1-50% |

The present invention also contemplates mixing the iron oxide and suspending agent, adding water as necessary to lower viscosity. The iron oxide catalyst has a high surface are to mass ratio to promote suspension and to promote effective NOx reduction with high surface contact with combustion gases during fuel combustion. The dispersing and suspending agent and iron oxide catalyst are added directly to the solid fuel such as coal, wood, or biomass before or during combustion. This method enables good dispersion of the iron oxide on the surface of the coal. Maintaining the iron oxide catalyst on the surface of the coal ensures maximum contact with combustion gases for effective and efficient reduction of NOx and other noxious emissions.

Another of the compositions contemplated by this invention includes a dispersing and suspending agents such as a protective colloid with one or more catalysts. The percentage of ingredients on a weight basis is as follows:

| Colloid like polyvinyl alcohol | 1-12% |
|---|---|
| Catalyst | 5-40% |
| Oil or hydrocarbon wax | 5-50% |
| Water | 40-89% |

The catalyst is suspended in the protective colloid much like as done in the manufacturing of pigments for paint would include mixing or grinding catalyst with oil or hydrocarbon wax then mixing or grinding with a protective colloid and water solution forming an emulsion. The catalyst may include compounds including Aluminum silicate and other Zeolites, Tungsten Oxide, Vanadium Oxide, Titanium dioxide, Iron Oxide as well as reacted metals, Iron Compounds and Iron containing compounds and any combination of the above. The catalysts should be of small particle size to obtain the greatest "surface area to mass" ratio. The protective colloid and catalysts are added directly to the solid fuel such as coal, wood, or biomass before or during combustion. This method enables good dispersion of the catalysts on the surface of the coal. Maintaining the catalysts on the surface of the coal ensures maximum contact with combustion gases for effective and efficient reduction of NOx and other noxious emissions. Chorine containing compounds may be added with the boiler manufacturer chorine limits in mind.

A method of producing Ammonia to further effect the reduction of NOx during the combustion of coal, wood, or biomass, is also provided wherein the method promotes the following reaction:

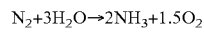
$$N_2 + 3H_2O \rightarrow 2NH_3 + 1.5O_2$$

This method includes applying catalyst to coal, wood or biomass and burning coal, wood, or biomass and further comprises a micronized catalyst having the highest surface area to mass ratio, said catalyst being made of titanium dioxide and a co-catalyst including materials selected from at group consisting of aluminum oxide, aluminum silicate and other zeolites, vanadium oxide, tungsten oxide, potassium oxide, sodium oxide, iron oxide, other iron containing compounds and combination of the foregoing.

A method of producing Ammonia to further effect the reduction of NOx during the combustion of coal, wood, or biomass, is also provided wherein said method promotes the following reaction:

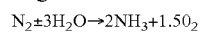
$$N_2 \pm 3H_2O \rightarrow 2NH_3 + 1.5O_2$$

This method includes applying catalyst to coal, wood or biomass and burning coal, wood, or biomass and further comprises a micronized catalyst having the highest surface area to mass ratio, said catalyst being made of iron oxide and a co-catalyst including materials selected from at group consisting of aluminum oxide, aluminum silicate and other zeolites, vanadium oxide, tungsten oxide, potassium oxide, sodium oxide, titanium dioxide, and combination of the foregoing.

Another of the methods contemplated by this invention includes a method of applying a NOx reduction agent to a combustible solid fuel prior to introduction of the fuel to the combustion process. The method includes providing a source of combustible material like coal, wood, or biomass. The method also includes providing a suspension and dispersing agent essentially comprising by weight,

| | |
|---|---|
| A Hydrocarbon wax | 0-60% |
| An Emulsifying agent or a protective colloid | 1-20% |
| Ammonia | 0-2% |
| Ammonia like compounds selected from the group consisting of Amides, Amines, Amino acid and other chemical compounds which contain at least one NH, $NH_2$, or $NH_3$ functional group | 0-60% |
| Water | 30-90% |

The method also provides a catalyst agent comprising a plurality of catalysts including materials selected from the group consisting of Aluminum Silicate or other Zeolites, Vanadium Oxide, Tungsten Oxide, Titanium Dioxide, Iron Oxide, other Iron Compounds and combinations of the foregoing. The catalysts each have a high surface area to mass ratio for optimized performance to catalyze the reactions that reduce NOx emissions from the combustion process. The catalysts also have a particle size similar to paint grade pigments.

The suspension and dispersing agent is combined with the catalyst agent such as to produce a stable suspension of the catalyst agents within the mixture. The mixture is designed to wet the surface of the combustible material upon application and evenly distribute and maintain the mixture over the surface of the combustible material. The mixture is applied to the combustible material by a spraying method. The catalyst agents remain adhered to the surface of the combustible material to ensure they are available at the earliest stages of the combustion process to maximize the ability to effect the reduction of NOx during the combustion process.

Another of the methods contemplated by this invention includes a method of reducing NOx emissions from the combustion of coal and other solid fuels. The method includes providing a source of combustible material like coal, wood, or biomass. The method also includes providing a suspension and or dispersing agent essentially comprising by weight,

| | |
|---|---|
| A Hydrocarbon wax | 0-60% |
| A Fatty Acid | 0-10% |
| Ammonia | 0-2% |
| Ammonia like compounds selected from the group consisting of Amides, Amines, Amino acid and other chemical compounds which contain at least one NH, $NH_2$, or $NH_3$ functional group | 0-60% |
| Water | 30-90% |
| A micronized catalyst agent comprising of Titanium Dioxide | 1-30% |

The method also provides a co catalyst comprising of micronized catalysts including materials selected from the group consisting of Aluminum Silicate and other Zeolites, Vanadium Oxide, Tungsten Oxide, Iron Oxide, other Iron Compounds and combinations of the foregoing; and the catalysts, each having a high surface area to mass ratio for optimized performance to catalyze the reactions that reduce NOx emissions from the combustion of coal; and the catalysts, each having a particle size similar to paint grade pigments.

The method also includes introducing the suspension and dispersing agent and catalyst agent and coal in a manner to place the agent on the surface of the fuel to maximize the contact between agent, air, and combustions gases; introducing agent and fuel into the combustion process, and causing or allowing the suspension and dispersing agent or catalyst agent or a combination of the suspension and dispersing agent and catalyst agent to effect the reduction of NOx emissions from the combustion process.

The present invention also improves combustion efficiency enabling the reduction of fuel consumption resulting in net reduction of other noxious emissions and compounds of concern like carbon dioxide.

A method of reducing Carbon Dioxide per unit of energy captured while controlling the emissions of NOx from a combustion process is also provided wherein there may be no modifications to the boiler combustion equipment. This method generally comprises: providing a combustible solid fuel, providing a micronized catalyst material; Introducing the micronized catalyst material to the combustible solid fuel in a manner to evenly distribute the micronized catalyst on the surface of the combustible solid fuel; introducing the micronized catalyst and combustible solid fuel to a combustion process where there is no modification of the combustion equipment; allowing increasing air and or oxygen flow into the combustion process such as to allow increasing flame or combustion zone temperatures to increase energy output per unit combustible solid fuel resulting in increased energy capture per unit combustible solid fuel introduced, allowing the micronized catalyst to effect the control of NOx emissions during the combustion process.

In this case, combustion temperatures are increased by decreasing the ratio of fuel to air or oxygen. This also results in less unburned fuel and less Carbon dioxide released relative to useful energy capture. It should be noted that a common practice in boiler operations to starve the combustion process of enough air to achieve more efficiency because of the need to control NOx. The use of catalyst allows for control of NOx and improves efficiency.

Having described the preferred embodiments of the invention, it will be obvious to those or ordinary skill in the art that many modifications and changes can be made without departing from the scope of the appended claims.

What is claimed is:

1. A method of assisting complete combustion of coal comprising applying to the coal a chemical change reagent prior to combustion of the coal to provide a surface coating of the chemical change reagent on the coal, the chemical change reagent comprising a hydrocarbon wax, in which the hydrocarbon wax is present from 15 percent to 30 percent by weight, the chemical change reagent further comprising a calcium compound.

2. The method of claim 1, in which the hydrocarbon wax is a synthetic wax.

3. The method of claim 1, further comprising configuring the chemical change reagent to comprise polyvinyl alcohol.

4. The method of claim 3, in which the polyvinyl alcohol is present from 2 percent to 4.5 percent by weight.

5. The method of claim 1, further comprising configuring the chemical change reagent to comprise an amount of the calcium compound that reduces the amount of sulfur dioxide in the coal when the coal is burned.

6. The method of claim 1, in which the chemical change reagent comprises the calcium compound and 2 to 5% by weight polyvinyl alcohol, 15 to 30% by weight of the hydrocarbon wax, 0 to 0.5% by weight of a biocide and water.

7. The method of claim 1, in which the chemical change reagent is a latex emulsion.

8. A method of reducing NOx and SOx emissions in coal comprising:
applying a NOx reducing reagent to a surface of the coal prior to combustion of the coal, and
applying a Sox reducing reagent to a surface of the coal prior to combustion of the coal in which one or both of the NOx and SOx reducing reagent comprise a hydrocarbon wax and a calcium compound, in which the hydrocarbon wax is present from 15to 30% by weight.

9. The method of claim 8, in which the NOx reducing reagent is configured as an emulsion

10. The method of claim 9, in which the emulsion comprises the hydrocarbon wax, the calcium compound, a polyvinyl alcohol and water.

11. A method of treating coal to reduce the level of NOx and SOx emissions resulting from combustion of the coal, the method comprising applying a surface coating to coal prior to combustion of the coal, the surface coating comprising a NOx reducing reagent and a SOx reducing reagent, in which one or both of the NOx and SOx reducing reagent comprise a hydrocarbon wax and a calcium compound, in which the hydrocarbon wax is present from 15 to 30% by weight.

12. The method of claim 11, in which the NOx reducing reagent in the coating further comprises polyvinyl alcohol.

13. the method of claim 1, in which the hydrocarbon wax is selected from the group consisting of a paraffin wax, a slack wax, a microcrystalline wax, an olefinic wax and mixtures thereof.

* * * * *